May 16, 1933.    J. B. LEA    1,908,852
HOSE REEL
Filed July 8, 1931    3 Sheets-Sheet 1

Inventor
James B. Lea
By Clarence A. O'Brien
Attorney

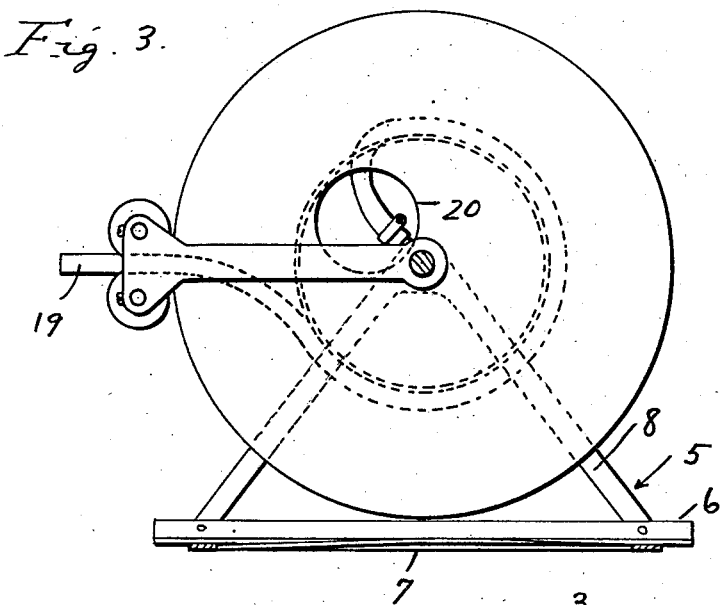
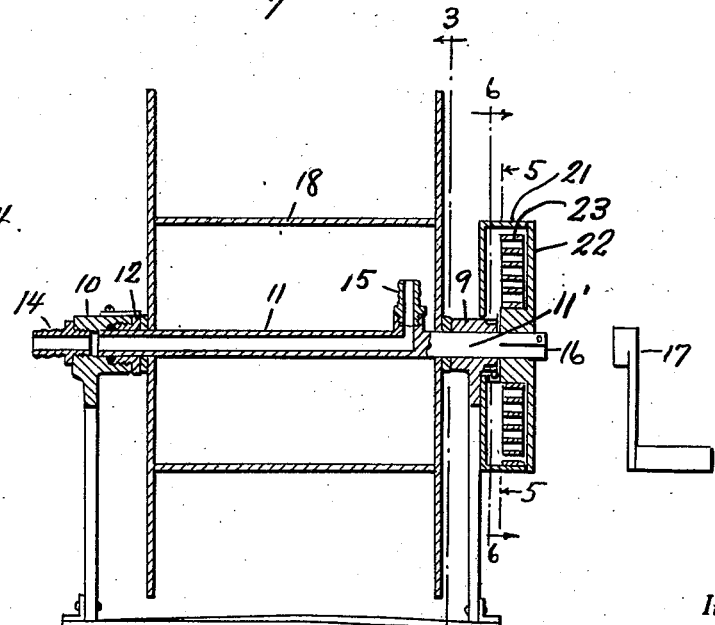

May 16, 1933.  J. B. LEA  1,908,852
HOSE REEL
Filed July 8, 1931  3 Sheets-Sheet 3

Inventor
James B. Lea
By Clarence A. O'Brien
Attorney

Patented May 16, 1933

1,908,852

UNITED STATES PATENT OFFICE

JAMES B. LEA, OF VANCOUVER, BRITISH COLUMBIA, CANADA

HOSE REEL

Application filed July 8, 1931. Serial No. 549,512.

The present invention relates to a reel for use with a garden hose or the like and has for its prime object to provide means whereby the hose may be stored on a reel so as to be convenient and ready for use.

Another very important object of the invention resides in the provision of a hose reel of this nature which is simple in its construction, strong and durable, inexpensive to manufacture, easy to manipulate, compact in its arrangement of parts, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 3 is a vertical section taken substantially on the line 3—3 of Figure 4.

Figure 4 is a vertical section taken substantially on the line 4—4 of Figure 1.

Figure 1:
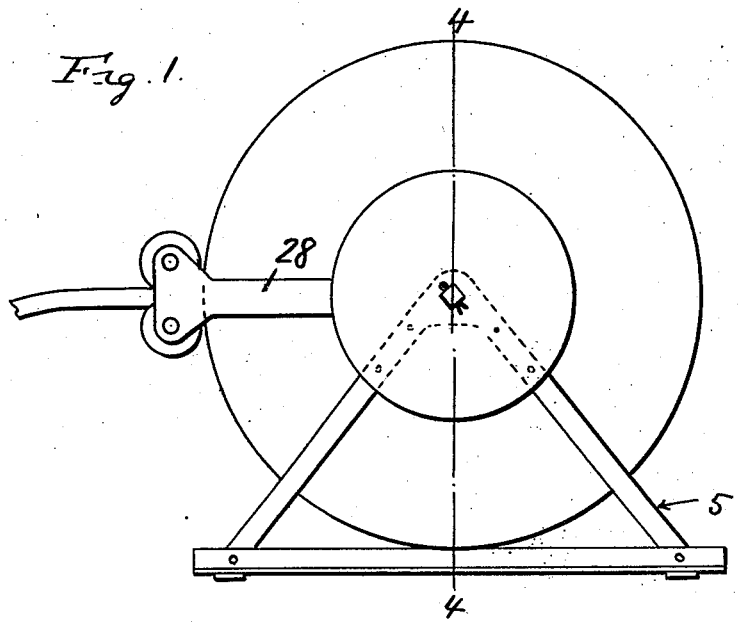
Figure 1 is a side elevation of a reel embodying the features of my invention.
Figure 2:
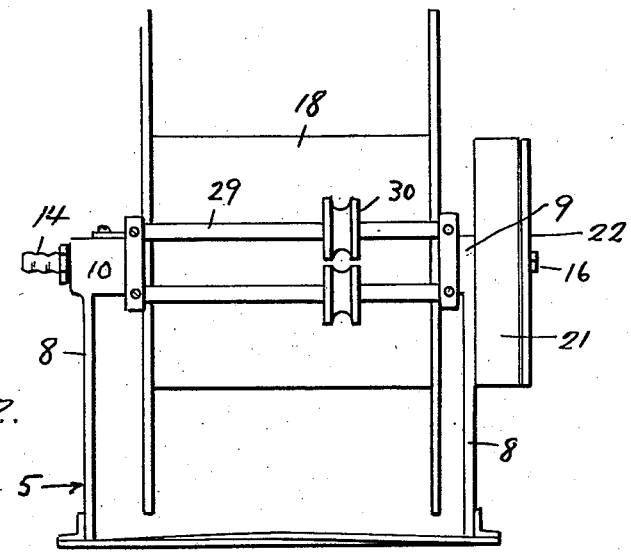
Figure 2 is a front elevation thereof.
Figure 5:
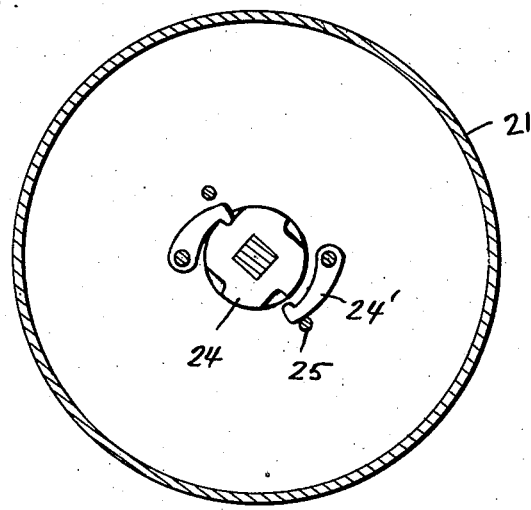
Figure 5 is a detail section taken substantially on the line 5—5 of Figure 4.
Figure 6:
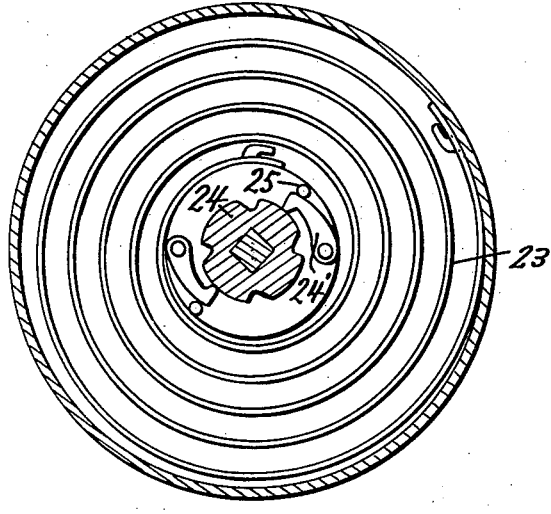
Figure 6 is a detail section taken substantially on the line 6—6 of Figure 4.

Referring to the drawings in detail it will be seen that numeral 5 denotes a suitable stand which in the present showing of the device comprises a pair of spaced parallel angle irons 6 held in position by a pair of diagonal braces 7. A pair of inverted V-shaped standards 8 rise from the angle irons 6 and at their apexes are formed with bearings 9 and 10.

Numeral 11 denotes a shaft hollow throughout the major portion of its length having one end solid as is indicated at 11'. This end 11' is journalled in the bearing 9 while the other end is open and journalled in the bearing 10 and a stuffing box 12 is associated therewith. A threaded nipple 14 is engaged in the bearing 10. A lateral threaded nipple 15 is engaged with the hollow portion of the shaft 11 adjacent the solid end 11. The extremity of the solid end 11 is square as is indicated at 16 so that a crank 17 may be engaged therewith. A spool or drum 18 is fixed on the shaft 11 between the bearings 9 and 10 and a hose 19 is adapted to be wound thereabout and having an end engaged with the nipple 15. The side of the drum is formed with an opening 20 so that access may be obtained to the inner end of the hose for connecting and disconnecting the same with respect to the nipple 15. A spring casing 21 is anchored on the bearing 9. A disk 22 closes the outer end of the casing 21 and is on the square terminal 16 to turn therewith. A coil spring 23 has one end fixed to the disk 22 and the other end fixed to the casing 21.

A notched portion 24 is formed on the bearing 9 adjacent the hub portion of the disk 22 and is engaged by pawls 24 pivoted on said hub portion and limited in their outward movement by lugs 25.

It will be seen that this spring and pawl and notched wheel arrangement operates similar to the ordinary spring shade roller. Thus when the hose is pulled out to unwind from the reel, the spring 23 is wound up and has a tendency to rewind the hose on the reel when the wheel 24 is free from the pawls 24' which is accomplished merely by judging the holes as will be quite apparent.

A pair of arms 28 are rockable on the shaft 11 one to each side of the reel 18 and between the outer ends of these arms are a pair of parallel shafts 29 on which are rotatable and slidable grooved rollers 30 between which the hose is trained.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

In a reel construction, a pair of standards having bearings, a shaft carried by said bearings and having one end thereof squared, a casing carried by one of said bearings, a disc forming a closure for said casing and having a hub secured to the squared end portion of said shaft, a spring having one end secured to the casing and having the other end thereof secured to said hub, pawls carried by said hub, said last mentioned bearing having a plurality of teeth for engagement by said pawls and a reel confined between said bearings, said casing, said disc and said spring being located outwardly of said standards.

In testimony whereof I affix my signature.

JAMES B. LEA.